United States Patent [19]
Giordano

[11] 3,729,857
[45] May 1, 1973

[54] INSECT ELECTROCUTOR

[75] Inventor: Frank L. Giordano, Stone Mountain, Ga.

[73] Assignee: Insect-O-Cutor, Inc., Stone Mountain, Ga.

[22] Filed: Feb. 23, 1971

[21] Appl. No.: 117,944

[52] U.S. Cl. ................................................. 43/112
[51] Int. Cl. ........................................... A01m 1/22
[58] Field of Search .................... 43/112, 98, 99, 113

[56] References Cited

UNITED STATES PATENTS

| | | | |
|---|---|---|---|
| 2,835,071 | 5/1958 | Partridge | 43/112 |
| 2,941,328 | 6/1960 | Streat | 43/112 |
| 2,645,877 | 7/1953 | Pohlman | 43/113 |
| 1,899,199 | 2/1933 | Kaiser | 43/112 |

FOREIGN PATENTS OR APPLICATIONS

| | | | |
|---|---|---|---|
| 245,515 | 6/1963 | Australia | 43/112 |

*Primary Examiner*—Hugh R. Chamblee
*Attorney*—Owen & Owen

[57] ABSTRACT

The disclosure relates to a flying insect electrocutor including a pair of spaced side panels, and two bottom supports spaced below the housing and also extending between the side panels. A pair of planar electric grids are positioned between the side panels. The grids diverge outwardly in a downward direction. Black light lamps are positioned within the grids to attract the insects. A collection tray is removably positioned beneath the grids.

8 Claims, 4 Drawing Figures

Patented May 1, 1973
3,729,857
2 Sheets-Sheet 1
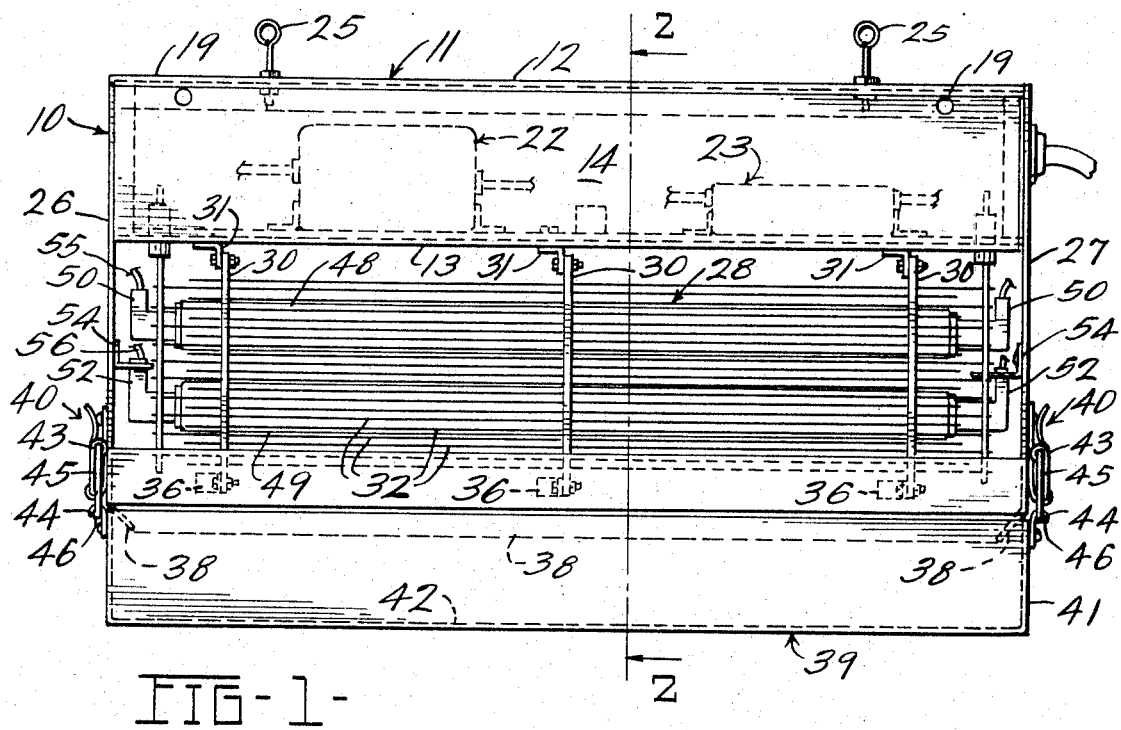
FIG-1-
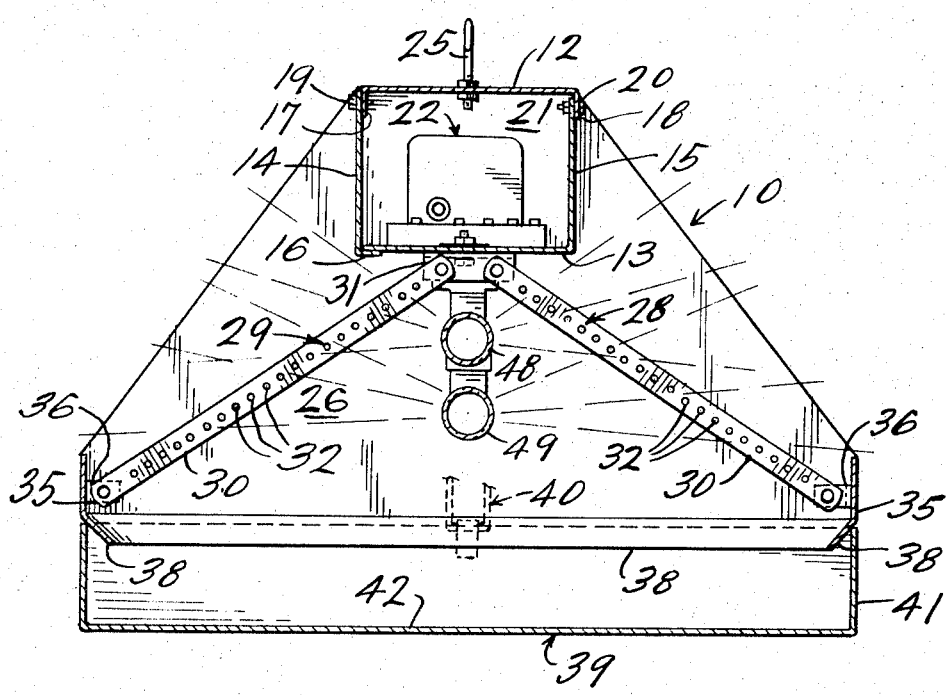
FIG-2-
INVENTOR:
FRANK L. GIORDANO.
BY Owen & Owen
ATT'YS.

Patented May 1, 1973
3,729,857
2 Sheets-Sheet 2
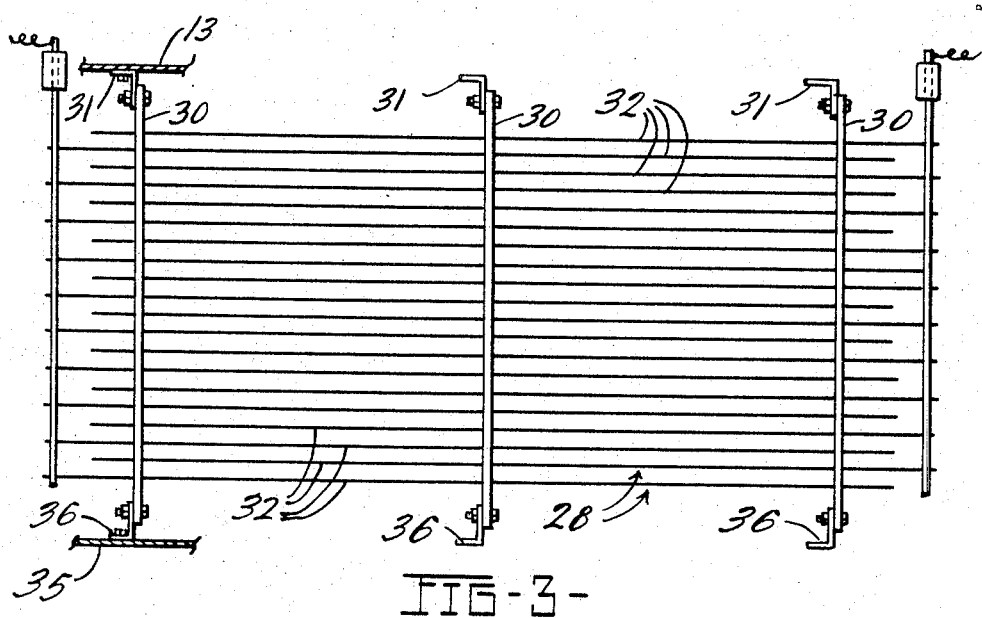
FIG-3-
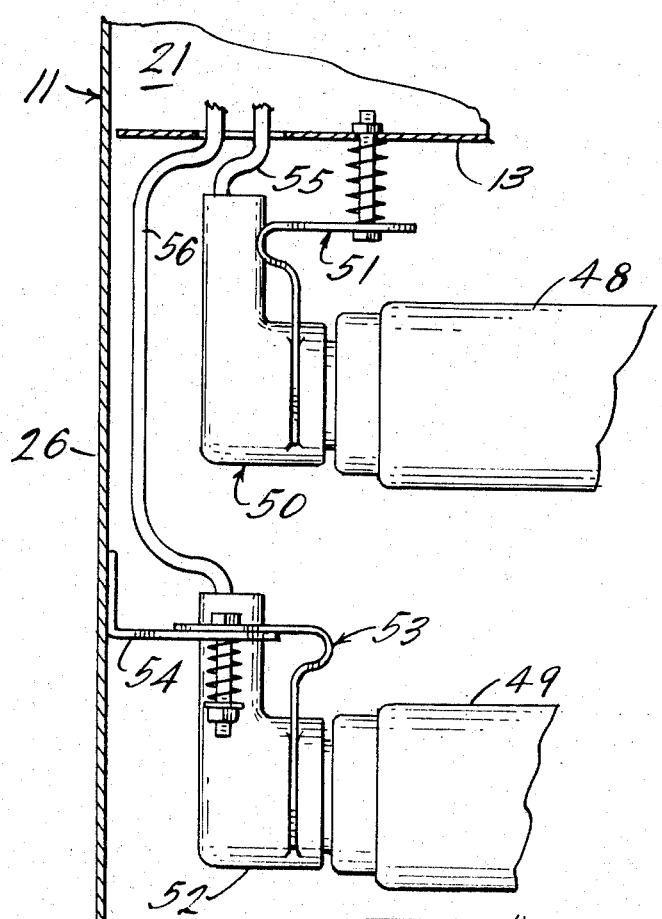
FIG-4-
INVENTOR:
FRANK L. GIORDANO.
BY
Owen & Owen
ATT'YS.

INSECT ELECTROCUTOR

BACKGROUND OF THE INVENTION

While electric flying insect traps, known to the prior art, have been used both in domestic and commercial applications, a major problem has remained in, for examples, commercial food and meat processing and packaging operations. In these commercial applications, it is vital that the dead insects be confined so that they do not contaminate the food and meat products. It is apparent that to contaminate the food processing operation with dead insects is at least, if not more, objectionable than are the presence of the flying insects.

SUMMARY OF THE INVENTION

The present invention relates to a flying insect electrocutor having direct ray black light attraction. At least one black light lamp is positioned between a pair of diverging and planar electrical grids. The electrical grids generally form an inverted V configuration. A readily removable collection tray is positioned below the grids to receive the dead flying insects.

It is the primary object of the present invention to provide an improved flying insect electrocutor.

BRIEF DESCRIPTION OF THE DRAWINGS

FIG. 1 is a side view in elevation of a flying insect electrocutor according to the present invention;

FIG. 2 is a vertical sectional view taken along the line 2—2 of FIG. 1 and indicating diagrammatically by dashed lines and arrows the paths along which the flying insects approach the black lights;

FIG. 3 is an enlarged plan view of a grid assembly; and

FIG. 4 is an enlarged detail view showing the mounting of the black light lamps.

DESCRIPTION OF THE PREFERRED EMBODIMENT

Referring to the drawings, a flying insect electrocutor, according to the present invention, is indicated by the reference number 10. The flying insect trap 10 includes a frame assembly 11, which in the present embodiment comprises a rectangular housing having a top 12, a bottom 13 and two opposed side walls 14 and 15. The bottom 13 is integral with the side wall 15. The side wall 14 has a lower lip 16 which receives and supports one side of the bottom 13. The top 12 has a pair of longitudinally extending depending edges 17 and 18. The side wall 14 is connected to the depending edge 17 by a pair of sheet metal screws 19. Similarly, the integral side wall 15 and bottom 13 are connected to the top 12 by a pair of sheet metal screws 20. The longitudinally extending frame assembly 11 defines a space 21 within which is positioned a transformer 22. In the present embodiment, the transformer 22 has a 110-120 volt primary input with a 4,000 volt, 9 milliampere secondary output. A ballast housing 23 is also positioned within the space 21. In the present embodiment, the ballast housing 23 includes a two-lamp ballast circuit for rapid or instant-starting lamps.

A pair of I-bolts 25 are attached to the top 12 of the frame assembly 11 and are used, for example, to suspend the flying insect trap 20 at a desired location above a food processing or packaging operation. A pair of side panels 26 and 27 are positioned in an opposed relationship adjacent the ends of the top 12. The frame assembly 11 extends between the side panels 26 and 27.

A pair of planar electrical grids 28 and 29, which are in electrical communication with the transformer 22, are positioned between the side panels 26 and 27. The grids are generally planar and diverge outwardly in a downward direction. As shown in FIG. 2, a vertical cross section of the grids 28 and 29 form an inverted V configuration. This is an important feature of the present invention. It has been found that because of the present configuration the problem of having electrocuted flying insects falling downwardly, upon a food processing or packaging operation, is minimized.

The grids 28 and 29 include insulating supports 30 (see FIGS. 1 and 3) which are connected at their upper ends to angle brackets 31 which are in turn connected to the bottom 13 of the frame assembly 11. The grids 28 and 29 also include parallel grid wires 32 which are held in their proper position by the insulated supports 30. Referring to FIG. 3, alternate ones of the grid wires 32 are in communication with the two sides of the electrical circuit to form a high voltage electrical field between the adjacent pairs of grid wires 32. A pair of bottom supports 35 (see FIG. 2) extend between the side panels 26 and 27. The lowermost ends of the insulated supports 30 of the grids 28 and 29 are attached to angles 36 which are connected to the bottom supports 35.

The bottom supports 35 include inwardly directed lips 38 at their lowermost edges. The inwardly directed lips 38 tend to direct falling insects into a collection tray 39 which is removably positioned below the grids 28 and 29.

The collection tray 39 is rectangular in the present embodiment and is removably attached by latches 40 which are mounted adjacent the lower edges of the side panels 26 and 27. The collection tray 39 includes a side wall 41 and a bottom wall 42. Each of the latches 40 includes a latch element 43 which is mounted on one of the side panels 26 or 27. However, one or more of the latch elements may be mounted on the bottom supports 35 if desired (not shown). The latch element 43 cooperates with another latch element 44 which is mounted on the side wall 41 of the collection tray 39. In the present embodiment, the latch elements 43 include a vertically movable ring 45 which cooperates with a notch 46 defined by the latch element 44.

Referring to FIGS. 1, 2 and 4, two longitudinally extending black light lamps 48 and 49 are mounted below the frame assembly 11 and are positioned between the diverging grids 28 and 29. The black light lamps 48 and 49 direct rays of controlled spectrum light in such a manner that flying insects are attracted toward the lamps 48 and 49 along paths which pass through the grid wires 32. It has been found that the present invention is superior to prior art indirect or reflected light ray structures. In the present embodiment lamp sockets 50 are supported by spring mounted brackets 51 which depend from the bottom 13 of the frame assembly 11. Similarly, sockets 52 are supported by spring mounted brackets 53 which are mounted on an angle 54 attached to the side panels 26 and 27. The sockets 50 receive the black light lamp 48 and the sockets 52 receive the black light lamp 49. Electrical wires 55 and 56 are each connected to a 110-115 volt circuit within the space 21 defined by the frame assembly 11.

In operation, the flying insect trap 10 is connected to a source of electrical power. The electrical grids 28 and 29 are energized along with the lamps 48 and 49. Flying insects are attracted to the lamps 48 and 49 and move generally along the paths indicated by the dashed lines in FIG. 2. As the flying insects strike or pass the electrical grids 28 and 29, they are electrocuted and fall downwardly into the collection tray 39. It has been found that the present flying insect trap 10 provides a most efficient apparatus for controlling flying insects in food processing and packaging plants. After a period of time, the collection tray 39 is removed by releasing the latches 40 and the tray 39 is emptied. The tray 39 is then replaced and the trap 10 is again ready for operation.

What I claim is:

1. An escape proof flying insect electrocutor comprising, in combination, a pair of spaced side panels, frame means extending between said side panels, a pair of planar electric grids positioned between said side panels, said grids diverging outwardly in a downward direction whereby a vertical cross section of said grids forms an inverted V, a high voltage power source in electrical communication with said grids, black light lamp means, effective to emit direct rays of controlled spectrum light, positioned between said diverging grids, two bottom supports extending between said side panels, each of said bottom supports having an upper edge extending upwardly above the lowermost edge of an adjacent grid, whereby insects striking points adjacent the lowermost edge of a grid are restrained from egressing from said flying insect electrocutor by said bottom supports, a collection tray positioned below said grids, said bottom supports having a portion positioned adjacent said collection tray, whereby dead insects fall downwardly into said collection tray, said collection tray comprising a bottom and an upstanding side wall, and attaching means for removably holding said collection tray beneath said grids.

2. A flying insect electrocutor, according to claim 1, wherein said frame means comprises a hollow housing extending between said side panels.

3. A flying insect electrocutor, according to claim 2, wherein said lamp means includes two black light lamps positioned beneath said hollow housing.

4. A flying insect electrocutor, according to claim 1, wherein said attaching means comprises cooperating latch elements mounted on said side panels and said collection tray side walls, respectively.

5. A flying insect electrocutor, according to claim 1, wherein said collection tray is rectangular.

6. An escape proof flying insect electrocutor comprising, in combination, a longitudinally extending frame means defining a space therein, means for suspending said electrocutor, opposed side panels adjacent each end of said frame means, a pair of bottom supports extending between said opposed side panels, said bottom supports having inwardly directed lips, a pair of planar electric grids mounted below said frame means and between said side panels, said grids diverging outwardly in a downward direction, each of said planar electric grids terminating at a lower end, said inwardly directed lips extending upwardly above said lower ends of said grids, whereby insects striking points adjacent said lower ends of said grids are restrained from egressing from said flying insect electrocutor by said lips, a high voltage power source in electrical communication with said grids, said power source including a transformer positioned within said space, at least two black light lamps, effective to emit direct rays of controlled spectrum light, positioned beneath said frame means and between said grids, and a removably mounted collection tray positioned below said grids, said bottom supports having a portion positioned adjacent said collection tray, whereby dead insects fall downwardly into said collection tray.

7. A flying insect electrocutor, according to claim 1, wherein said bottom supports include lower edges which extend downwardly into said collection tray.

8. A flying insect electrocutor, according to claim 7, including inwardly directed lips on said lower edges of said bottom supports.

* * * * *